United States Patent [19]
Estelle

[11] Patent Number: 4,991,945
[45] Date of Patent: Feb. 12, 1991

[54] ZOOM LENS
[75] Inventor: Lee R. Estelle, Rochester, N.Y.
[73] Assignee: Eastman Kodak Company, Rochester, N.Y.
[21] Appl. No.: 376,275
[22] Filed: Jul. 5, 1989
[51] Int. Cl.[5] .............................................. G02B 9/60
[52] U.S. Cl. .................................... 350/455; 350/450; 350/427
[58] Field of Search ............... 350/450, 455, 481, 423, 350/427, 454

[56] References Cited
U.S. PATENT DOCUMENTS
4,682,860 7/1987 Tanaka et al. ...................... 350/423
4,772,106 9/1988 Ogata et al. ......................... 350/427
4,815,830 3/1989 Sato et al. ........................... 350/427
4,911,539 3/1990 Tsunashima et al. ................ 350/450

FOREIGN PATENT DOCUMENTS
1259007 3/1961 France .
53-91756 1/1977 Japan .................................. 350/184

Primary Examiner—Paul M. Dzierzynski
Attorney, Agent, or Firm—Svetlana Z. Short

[57] ABSTRACT

A zoomable telephoto lens, comprising only five elements. The first three elements form a positive group and the last two elements form a negative group. The airspace between the two groups is made variable to effect zooming.

6 Claims, 1 Drawing Sheet

ZOOM LENS

CROSS-REFERENCE TO A RELATED APPLICATION

Reference is made to commonly assigned copending patent application Ser. No. 376269, filed simultaneously herewith in the name of Lee R. Estelle and entitled METHOD FOR EVALUATING AND DESIGNING LENSES.

BACKGROUND OF THE INVENTION

1. Field of the Invention

This invention relates to two-component zoom objectives suitable for use in photographic devices.

2. Description Relative to the Prior Art

Among photographic objectives for still cameras, a wide acceptance has been found by zoom lenses having a zoom ratio on the order of 1.5 to 2.0.

The designs for this type of optical system generally fall into two categories.

In the first category are so-called short zoom lenses that are comprised of a front negative optical unit and a rear positive optical unit, an example of which is disclosed in Japanese Kokai, laid open patent application, 53-91756. Despite the small size of the lens system, these systems have a serious drawback; namely, a long back focal length. Even though the lens itself may be short, a camera embodying the lens is inevitably bulky because of long back focal length.

Although this can be remedied by use of optical folding elements in the space between the lens and the film plane, the additional element increases the cost as well as weight of the optical system.

The second category of zoom lenses evolved in order to counter the problems associated with the first lens category. During the search for an approach to come up with small zoom lenses, lens designers had available to them the lenses that are comprised of two optical units of positive and negative power, counting from the front. These lenses have a small back focal length when compared to their focal length and are called telephoto lenses. This means that such lenses have a focal length such that the ratio of the distance from the front vertex to the image plane to the focal length is less than one. Descriptions of telephoto-zoom lenses exist in prior art; for example, FR. 1,259,007 and U.S. Pat. No. 4,682,860. However, these designs tended to consist of at least six lens elements (if color correction is desired) or tended to produce rather steep curvatures of surfaces of lens elements.

SUMMARY OF THE INVENTION

It is an object of the present invention is to provide a compact zoom lens that corrects polychromatic light.

Another object of the invention is to provide a lens system that is easily manufactured, and is relatively simple while retaining a small size for the lens itself and for the camera.

Still another object of the present invention is to provide a zoom lens with short back focal length while keeping the complexity of the system to a minimum.

To accomplish the above, according to the present invention, an example of a telephoto-zoom lens has the following properties:

The first positive group of the above-mentioned lens has a form of a common triplet;

the back negative group consists of a positive and a negative lens, counting from the front; and a rear surface of the negative group is concave.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENT

Figure 1A:
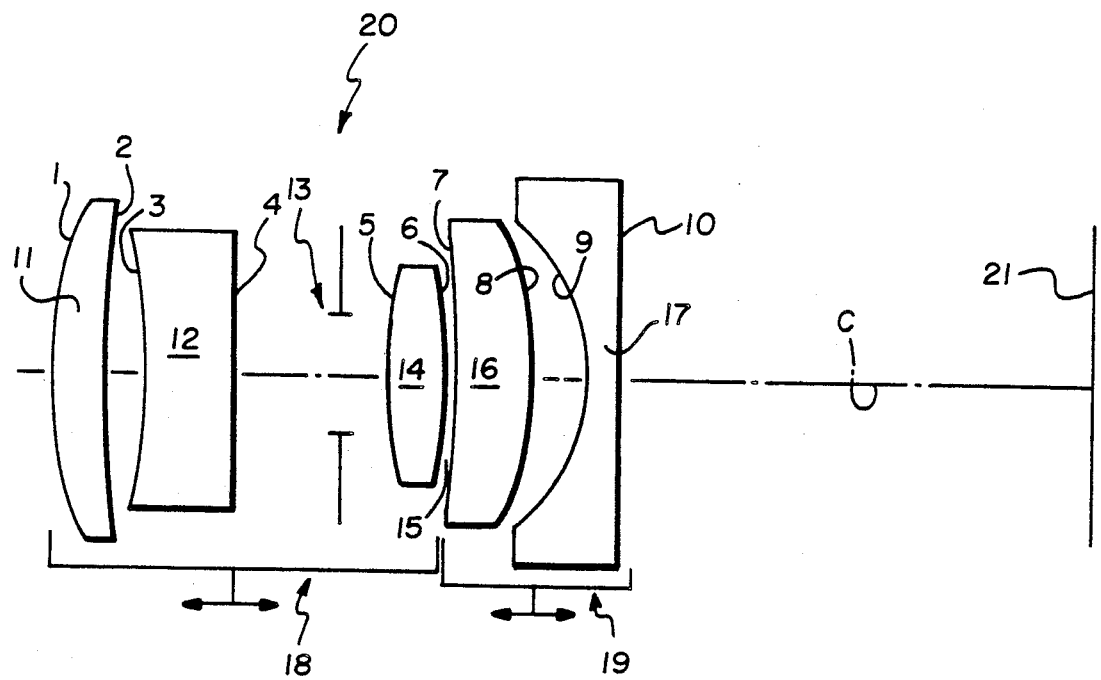
FIG. 1A shows the outline of the lens in the telephoto mode of operation.
Figure 1B:
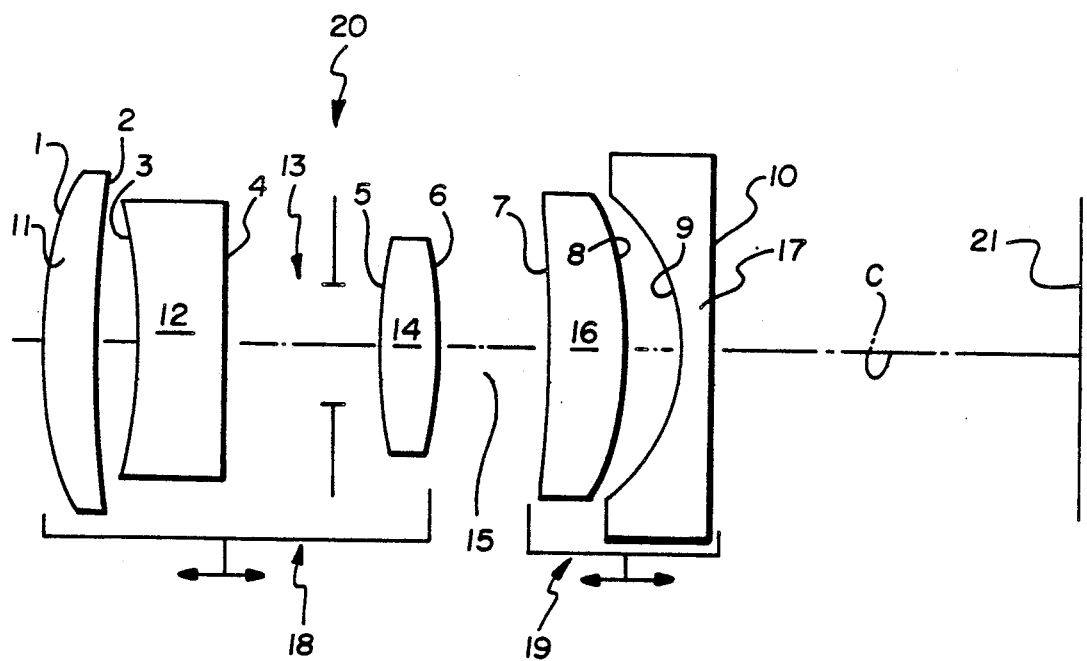
FIG. 1B shows the outline of the lens in the wide angle mode of operation.

A lens system in accordance with the present invention, in the form of an easily manufacturable telephoto-zoom lens, is illustrated in FIGS. 1A and 1B and is given the reference numeral 20. It is constructed, counting from the front, of a positive group 18, and a negative group 19. An airspace 15 between the positive lens group 18 and the negative lens group 19 is variable, to effect zooming between a wide angle mode and a telephoto mode of operation. The first, positive group 18 of the above-mentioned optical system is a triplet. Counting from the front, the triplet 18 consists of a positive lens element 11, a negative lens element 12 and another positive lens element 14. There is also an aperture stop 13, which is located in the space between the negative lens element 12 and a positive lens element 14. The second, negative lens group 19, counting from the front, consists of a positive lens element 16 and a negative lens element 17. The rear surface 10 of the above negative lens 17 in the negative group 19 is concave. The above zoom lens 20 is symmetrical about an optical axis C and forms an image on an image plane 21. The following is data for the optical system:

| Surface | Clear Aperture | Radius | Thickness | Refractive Index Nd | Abbe No. Vd |
| --- | --- | --- | --- | --- | --- |
| 1 | 19.60 | 25.8307 | 3.250 | 1.697 | 55.5 |
| 2 | 17.92 | 135.092 | 2.110 | | |
| 3 | 15.88 | −37.6293 | 5.100 | 1.805 | 25.4 |
| 4 | 12.50 | 2331.60 | 5.900 | | |
| | 6.93 | Diaphragm | 2.855 | | |
| 5 | 11.20 | 24.1911 | 3.120 | 1.697 | 55.5 |
| 6 | 12.14 | −48.6420 | A variable | | |
| 7 | 15.84 | −73.0033 | 4.450 | 1.697 | 55.5 |
| 8 | 17.17 | −20.9629 | 2.855 | | |
| 9 | 17.32 | −12.4750 | 2.000 | 1.786 | 44.2 |
| 10 | 21.97 | 2572.28 | | | |

In the table above, the "Thickness" dimension is the dimension along optical axis C between the surface of the line on which the dimension is given and the surface listed next below. It may be an element thickness as on the line of surface 1 or an air gap thickness as on the line of surface 2. "A" is a variable air gap that changes from 0.392 to 6.248 mm.

It will be observed that a lens system in accordance with the invention has only five lens elements, all of which are spherical and all of which have weak radii of curvature. A lens system in accordance with the present invention has only five lens elements while maintaining color correction, whereas, telephoto-zoom lenses such as disclosed in U.S. Pat. No. 4,720,179 require many more elements for color correction. A five element zoom lens with weak, easily manufacturable surfaces is disclosed in French Pat. Specification 1,259,007, but, that lens is not color corrected. Although, the Patent Specification 1,259,007 discloses that one of the lenses can be made into a doublet when color correction is required, such a change results in six elements.

Although U.S. Pat. No. 4,682,860 discloses a five element zoom telephoto lens, the disclosed lens has elements with relatively steep radii of curvature and thus is relatively costly to manufacture.

Because the lens of the present invention has only five elements and only surface with more than a very moderate radius of curvature it is easily manufacturable and thus inexpensive to build.

The above-identified commonly assigned copending U.S. Patent Application Ser. No. 376269 filed on July 5, 1989 and entitled METHOD FOR EVALUATING AND DESIGNING LENSES discloses means for characterizing a particular lens design in terms of manufacturability through the use of merit function components characterizing different manufacturing parameters. One of these merit function components characterizes a lens in terms of the steepness of the optical surfaces to provide a merit function component value W represented by the following formula:

$$\frac{\sum\limits_{i=1}^{N}\left|\frac{Clap_i'}{R_i}\right|}{2N} = W$$

where
$R_i$ = radii of curvature
N = number of surfaces
$Clap_i$ = clear aperture of surface i The invention has been described in detail with particular reference to a presently preferred embodiment, but i will be understood that variations and modifications can be effected within the spirit and scope of the invention.

What is claimed is:

1. A lens system capable of operation in wide angle and telephoto modes, including five lens elements arranged in two groups, an airspace between said groups, the length of said airspace being variable for zooming, three of said optical elements being positive and two of the said optical elements being negative, said optical elements having weak spherical surfaces or weak bendings so as to fulfill the following condition:

$$.22 < W < .27$$

$$\frac{\sum\limits_{i=1}^{N}\left|\frac{Clap_i}{R_i}\right|}{2N} = W$$

where
$R_i$ = radii of curvature
N = number of surfaces
$Clap_i$ = clear aperture of surface i.

2. A lens system as in claim 1, wherein said positive group is in front of said negative group, said negative group having a last lens element, said last lens element having a concave rear surface.

3. A lens system as in claim 2, wherein said negative, second group consists of two optical elements, one of the two optical elements of said second group being a positive element and the other of said two elements being a negative element.

4. A lens system as in claim 2, wherein the said positive lens element of said negative group is in front of said negative lens element of said negative group.

5. A lens system as in claim 2, 3 or 4, wherein said first, positive group has one positive lens element on each of the two sides of the negative lens element.

6. A lens system that satisfies the following conditions:

| Surface | Radius | Thickness | Refraction Index Nd | Abbe No. Vd |
| --- | --- | --- | --- | --- |
| 1 | 25.8307 | 3.250 | 1.697 | 55.5 |
| 2 | 135.092 | 2.110 | | |
| 3 | −37.6293 | 5.100 | 1.805 | 25.4 |
| 4 | 2331.60 | 5.900 | | |
| | Diaphragm | 2.855 | | |
| 5 | 24.1911 | 3.120 | 1.697 | 55.5 |
| 6 | −48.6420 | A variable | | |
| 7 | −73.0033 | 4.450 | 1.697 | 55.5 |
| 8 | −20.9629 | 2.855 | | |
| 9 | −12.4750 | 2.000 | 1.786 | 44.2 |
| 10 | 2572.28 | | | |

* * * * *